Jan. 14, 1969  J. STANGA  3,421,220
METHOD AND APPARATUS FOR CHEESE MOLDING AND FORMING
Filed Jan. 9, 1967  Sheet 1 of 2

Inventor
Joseph Stanga
By Wheeler, Wheeler, House & Clemency
Attorneys

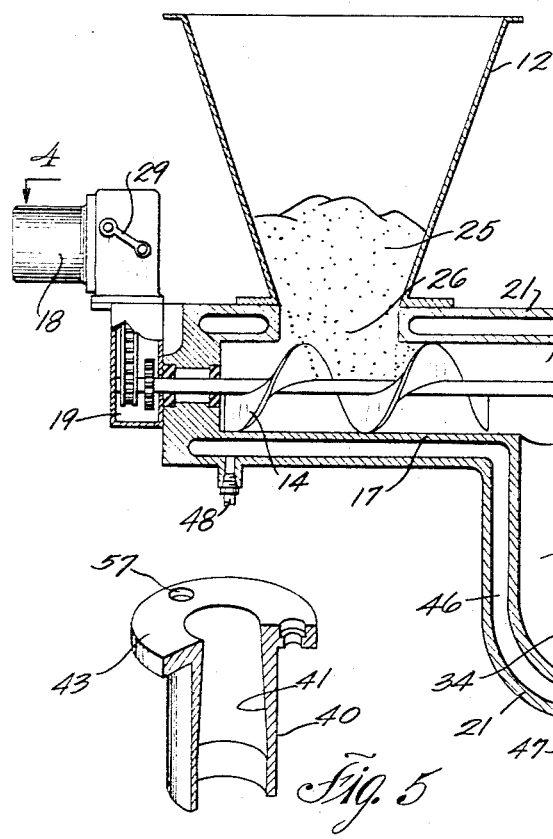
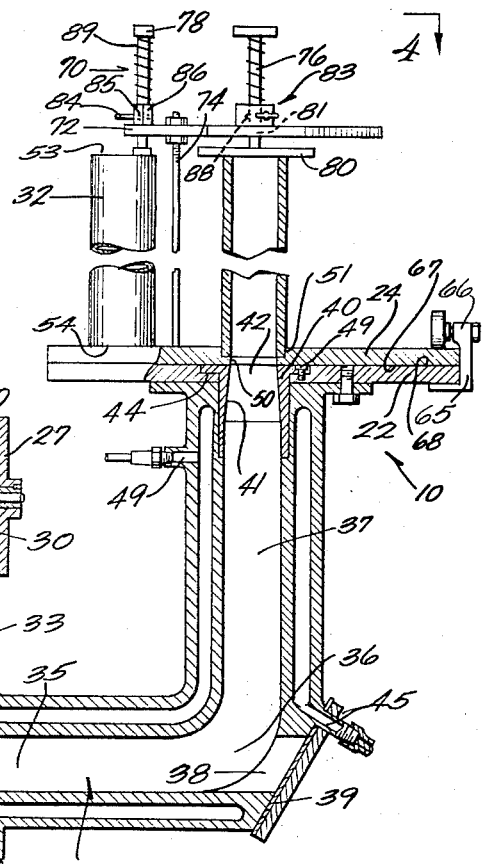
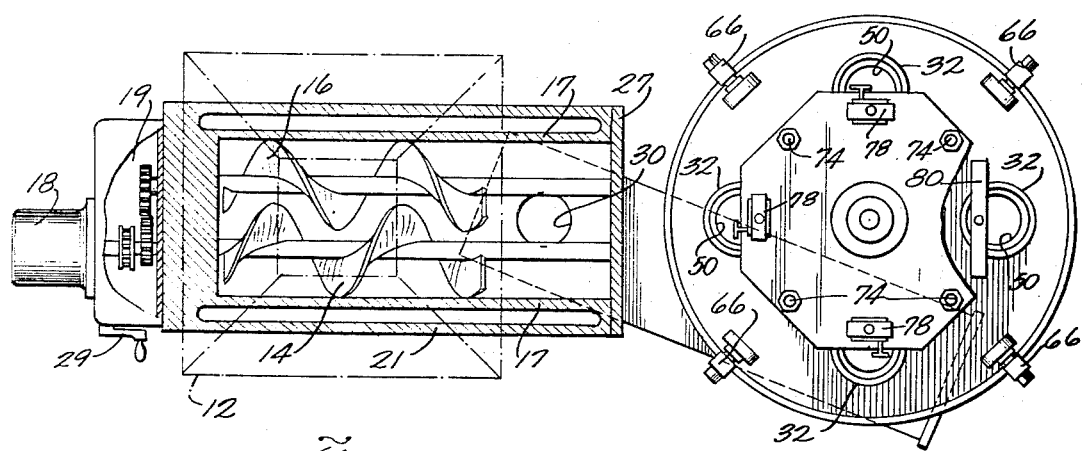

United States Patent Office 3,421,220
Patented Jan. 14, 1969

3,421,220
METHOD AND APPARATUS FOR CHEESE MOLDING AND FORMING
Joseph Stanga, Box 37, Rubicon, Wis. 53078
Filed Jan. 9, 1967, Ser. No. 608,021
U.S. Cl. 31—46                                16 Claims
Int. Cl. A01j 25/13; A21c 11/16; B65b 63/08

ABSTRACT OF THE DISCLOSURE

An apparatus and method for molding and forming plastic curd cheese such as provolone into a cheese with uniform texture, a smooth skin and with the characteristic size and shape in which it is marketed.

The method includes the steps of kneading the cheese, forcing the cheese under pressure through a chamber maintained at a temperature sufficient to melt the fats in the surface of the cheese, extruding the cheese through a constriction into formers having the desired shape for the finished cheese, and cooling the formers in a cold water bath to firm the skin and facilitate removal of the cheese from the former. The apparatus of this invention includes a hopper for containing a supply of cheese curd which is fed into an auger housing containing a pair of counter-rotating augers which urge the cheese column through a smooth-walled working chamber and into a series of removable cheese formers which are mounted on a turntable for successive registration with the outlet of the working chamber. As each former is filled the turntable is rotated, shearing the cheese in the former from the column. The auger housing and working chamber are maintained at an elevated temperature by warm water circulating through a water jacket which surrounds the working chamber and the auger housing.

Background of the invention

Difficulties have been encountered in the art in producing a machine or apparatus which molds and forms a cheese comparable in quality to a provolone cheese formed by traditional manual methods. Machines heretofore developed have experienced problems in providing a cheese with a smooth, non-porous outer skin which is free from cracks and which has a uniform texture throughout.

These qualities are of extreme importance in the art inasmuch as a porous outer skin with cracks does not adequately protect the cheese from the injurious effect of subsequent handling and presents a coating that is easily broken or entered by molds. Moreover, cheese with these characteristics often does not meet customer specifications and is not easily marketed. Accordingly, it is desirable that an apparatus which will mold and form cheese into the desired shapes also provide a cheese with a smooth, stiff, non-porous skin.

Summary of invention

In accordance with the present invention a cheese forming and molding apparatus and method therefor are provided which are suitable for use in making provolone cheeses of 10 to 100 pounds. In the art cheeses of 10 to 12 pounds are called salami, the cheeses weighing 14 to 25 pounds provolone, and the larger styles weighing 50 to 100 pounds being designated provolone giganti. The cheese forming apparatus of the present invention provides the characteristic shapes of the various styles with a cheese of uniform texture, and a non-porous smooth and stiff skin or film which is equal to or better than the quality of hand-made cheeses.

The method includes the steps of kneading the cheese, forcing a column of cheese through a smooth-walled working chamber maintained at an elevated temperature and extruding the cheese through a constricted opening into formers which are in the desired shape and length for the particular cheese being formed. As each former is filled the cheese contained therein is sheared from the cheese column. The former is then placed in a cold water bath to cool the cheese to allow removal of the cheese from the former. The use of individual formers for each cheese permits removal of the former from the apparatus for cooling. Warm cheese sticks to the walls of the former and is not easily removed without damage to the cheese skin.

The apparatus of the present invention includes positive pressure counter-rotating augers which knead the cheese while in an auger housing and which force a column of cheese through a working chamber. The working chamber has two bends which offer resistance to the flow of the cheese column through the apparatus resulting in compaction and compression of the cheese and cementing of the curd providing a cheese with uniform texture which is free of cracks or holes. A plurality of formers are removably carried by a turntable which is rotated for successive registration of the formers with the working chamber.

The auger housing and working chamber are maintained at a raised temperature by a water jacket which contains circulating water at a temperature sufficient to melt or soften the cheese fat to provide a smooth non-porous outer film.

Objects of the present invention include a cheese forming and molding machine that may be operated with a minimum of personnel. Other objects include a cheese machine adapted to fill various size cheese formers in continuous operation.

Other objects and advantages of the present invention will become apparent from following disclosure.

Description of the drawings

FIGURE 3 is a side elevational view in fragmentary section along line 3—3 of FIGURE 1.
FIGURE 4 is a plan view in partial section taken along line 4—4 of FIGURE 3.
FIGURE 5 is an enlarged view of a tapered sleeve partially broken away.

Description of the preferred embodiment

Figure 1:
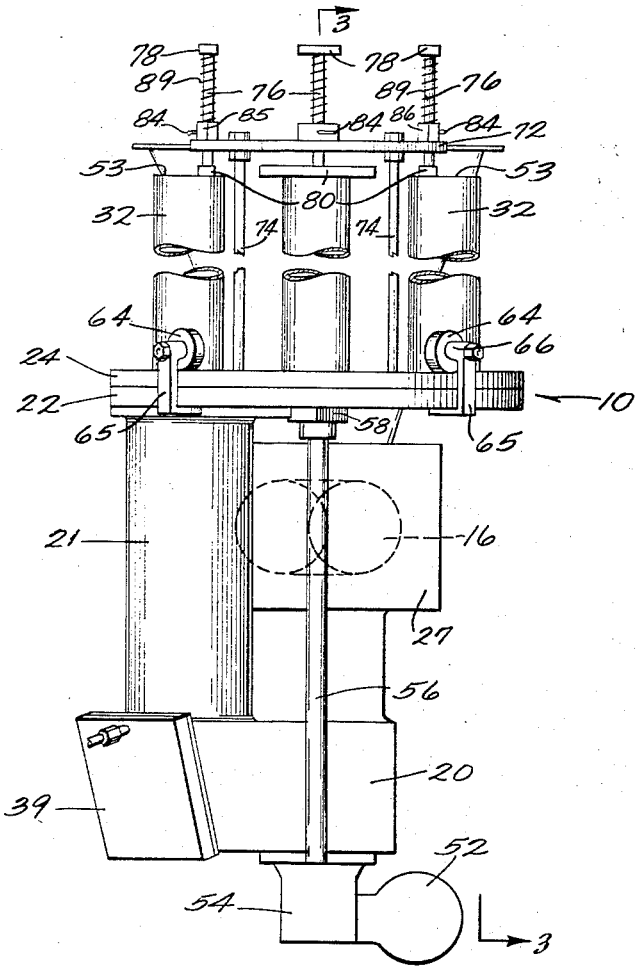
FIGURE 1 is an end elevational view of apparatus embodying various features of the present invention.
Figure 2:
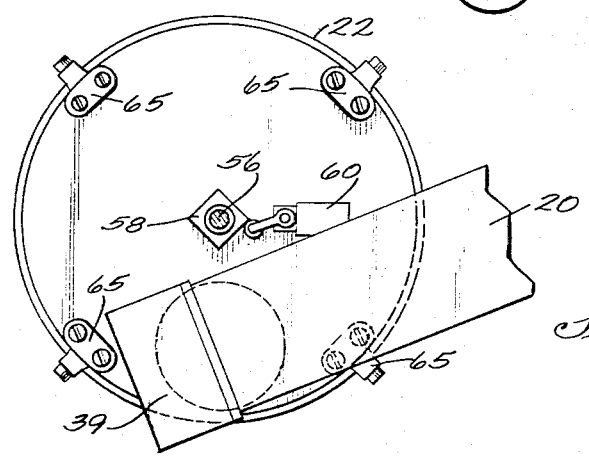
FIGURE 2 is a bottom view of the turntable.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The cheese forming and molding apparatus is generally designated 10. As best shown in FIGURE 3 it includes a hopper 12 and pressure means comprising a pair of counter-rotating augers 14 and 16 in an auger housing 17, a motor 18 and gear train 19. The apparatus also includes a working or forming chamber 20, a water jacket 21, a fixed turntable support 22 and a turntable 24. Description of the apparatus is also illustrative of one mode of carrying out the method of the present invention.

After the cheese curd is mixed it is placed in hopper 12 in large lumps which may weigh up to two hundred pounds. The cheese as it comes from the mixing vat is watery and thin. It will flow by gravity from the hopper into the auger housing 17. The augers 14 and 16 have intermeshing flights and are rotatably driven by a variable speed gear train 19. Auger 14 rotates counter clockwise and auger 16 rotates clockwise when observed in the end view shown in FIGURE 1. The gear train 19 is provided with a lever 29 for varying the speed of the augers 14 and 16.

The cheese curd 25 enters the auger housing 17 as a string or column 26. The rotating auger flights produce a mixing or kneading action on the cheese column 26 which cements the curd and eliminates mechanical holes or cracks. The auger housing 17 is generally elliptical in cross-section with the auger flights substantially filling the cross-sectional area. Cleaning of the auger housing and removal of the augers is facilitated by a plate 27 which is removably attached to the end of the auger housing. The positive pressure of the augers on cheese column 26 moves the cheese to the end cavity 100 of the auger housing. The auger flights terminate short of the cavity 100. The cheese packs into and accumulates in cavity 100 until it is filled. The cheese then passes through outlet 30 into the working chamber 20.

The working chamber 20 is generally tubular and smooth-walled and has a first portion 33 beneath the auger housing 17, a bend 34, a second portion 35 generally at right angles to the first portion 33, a bend 36 and a third portion 37 extending generally at right angles to the second portion 35. The cross-section of the working chamber 20 is generally cylindrical and slightly larger than the cross-section or diameter of the largest cheese that is to be made using my apparatus. The auger housing and working chamber are desirably constructed of stainless steel. An aperture 38 is provided adjacent bend 36 and covered by a removable plate 39 to afford cleaning of the working chamber 20. I have obtained best results with a working chamber 20 of a length of at least one and one-half to two times the length of the cheese formers 32 into which the cheese is ultimately extruded. When a shorter working chamber 20 is used surface cracks in the cheese column 26 are not completely removed. The bends 34 and 36 are provided to offer resistance to the flow of the cheese column 26. Auger pressure will supply the necessary force to move the cheese through the bends which compress and compact the cheese and provide a uniform texture with a completely cemented curd.

The upper end of the working chamber 20 is relieved at 37 to receive a removable sleeve 40. Sleeve 40 has an inside taper 41 which provides an outlet port 42 for the working chamber which is of a smaller diameter than the working chamber 20 and which corresponds to the diameter of the cheese former 32. The taper 41 provides the final compression on the cheese column 26 as it leaves the working chamber. Mounting of sleeve 40 to turntable support 22 is facilitated by an annular flange 43, with a plurality of apertures 35. Flange 43 seats in an annular recess 44 in turntable support 22 and is secured thereto by bolts 49 extending through apertures 57 and threaded into the turntable support 22. In using my apparatus various shaped sleeves 40 are utilized for different cheese shapes and sizes. If only one cheese size is being made the apparatus can be used without interchangeable sleeves by providing an appropriately constricted outlet for the working chamber.

The water jacket 21 surrounds the working chamber 20 and the auger housing 17 and comprises a thin passage or duct 46 for circulation of water. The inlet 49 for the water jacket 21 is as best shown in FIGURE 3 located at the outlet end of the forming chamber 20. Three outlets 45, 47 and 48 are provided to drain the water jacket 21. Inlet 49 is connected to any suitable water source to maintain a constant flow of water around the augers and working chamber 20. The temperature of the circulating water is desirably controlled at 90 to 100 degrees F. This temeperature is sufficient to melt or soften the fats in the column of cheese 26 as it moves through the auger housing and the working chamber 20. Thus, the cheese curd is kept fluid. The flow of cheese along a smooth, warm wall promotes the formation of a smooth, non-porous exterior finish and the removal of any surface cracks or marks in the cheese column 26 caused by the auger flights. Alternate heating means could be employed to maintain the elevated temperature of the working chamber 20.

The cheese extruded from the working chamber 20 is measured and cut into the desired length by an arrangement which includes a turntable 24 carrying a plurality of cheese formers 32. The turntable 24 comprises a circular disk or plate of a diameter equal to the diameter of the turntable support 22 and is provided with four apertures 50. A cheese former 32 is removably secured above each aperture 50. The cheese formers 32 consist of thin walled cylinders with open top 53 and bottom 54. The turntable apertures 50 have an annular recess 51 best shown in FIGURES 3 and 4 to provide a seat for the bottom 54 of a cheese former 32.

The turntable 29 is rotated by shaft 56 driven by an electric motor 52 and gear box 54. The motor 52 is energized by a push button electrical switch not shown. Shaft 56 is provided with a cam 58 which operates a double pole, double throw limit switch 60. The cycle is commenced by actuating the push button and energizing the motor. This rotates turntable 24 to index the next succeeding aperture 50 into registration with the outlet 42 of the working chamber. When the aperture 50 thus registers, switch 60 actuated by a cam 58 on shaft 56 opens the turntable motor circuit to stop the turntable. It also closes the circuit for the auger motor 18 causing auger pressure which drives the cheese curd through the working chamber 20 and into the empty former 32. When the cheese former 32 is filled, the top of the cheese plug will be visible through the open top 53 of the former 32. The machine operator will then manually actuate the push button energizing motor 52 to again rotate the turntable 24 and cam 58. Switch 60 turns off the auger motor 18. Motor 52 will continue to rotate the turntable 24, thus shearing off the cheese column 26, until the next succeeding aperture 48 and former 32 register with the working chamber outlet 42. Cam 58 and switch 60 will then commence a new filling cycle as the motor 52 is turned off and motor 18 is actuated. The cam 58 is adjustable circumferentially on shaft 56 to co-ordinate the cycle.

The turntable support 22 is provided with four rollers 64 mounted to the support 22 for rotation about an axis transverse to the axis of the turntable by brackets 65 provided with bearing journals 66. The rollers 64 are in engagement with the turntable 24 and keep the inner face 67 of turntable 24 within $\frac{1}{64}$ of an inch from the inner face 68 of support 22, thus to prevent cheese accumulating between the blades and adhering to surfaces 67 and 68 during the shearing of the cheese column as the turntable 24 is indexed for axial alignment of the next aperture 50. But for this close tolerance, the cheese accumulation between surfaces 67 and 68 would eventually cause a drag interfering with rotation of the turntable 24. The shearing action on the cheese column under these conditions provides a smooth, firm, non-porous end for the cheese which is not obtained by conventional cutting techniques.

The cheese formers 32 are removably secured to the turntable 24 by clamps 70. The clamps 70 are secured to a frame which in the disclosed construction comprises a plate 72 mounted on four upstanding posts 74. Each clamp 70 is provided with a stem 76 with a handle 78 at the upper end and a cross bar 80 at the lower end. The stems 76 are movable through apertures 81 in plates 72. When an empty cheese former 32 is inserted in the turntable 24, the former is manually placed in aperture 50 and handle 78 is grasped by the operator and downward pressure exerted on the stem 76 urging the cross bar 80 against the top 53 of the former 32. The cross bars 80 are secured against the former tops 53 by clamps 83. Clamps 83 include a bolt 84 which extends through an aperture in plate 85 and is threaded into plate 86. The plates 85 and 86 are each provided with a semi-circular groove 88 surrounding stems 76. A handle on bolt 84 permits manual tightening of bolts 84 resulting in compression of the plates 85 and 86 against the stems 76. The handles 78 are biased upwardly by a spring 89 telescoped over stems 76 so that upon release of the clamping pressure on the stems 76 the spring will raise the cross bar from engagement with the upper end of the cheese former 32 permitting removal of the cheese former 32 from the turntable 24. When small cheese formers 32 are used, the posts 74 which support plate 72 can be provided with clamps to afford lowering of plate 72 and the entire clamping assembly.

My apparatus can be operated for continuous periods by one person. After a cheese former is filled it is removed from the turntable and placed in a cold water bath. The bath cools the cheese and creates a stiff skin which promotes sliding removal of the cheese from the former 32. An empty former 32 is placed on the turntable to replace the removed former and the sequence is continued.

The bends 34 and 36 in the working chamber cause abrupt changes in the direction of flow of the cheese and thus offer resistance to the flow resulting in compaction and compression of the cheese providing a cheese with a uniform texture free of cracks or holes.

I claim:

1. An apparatus for processing plastic curd cheese comprising a working chamber having an inlet and outlet, and having a plurality of abrupt angular bends to change the direction of the path of flow of said cheese, pressure means for moving a column of cheese through said working chamber, said pressure means having an outlet communicating with the inlet of said working chamber, a turntable having a series of apertures spaced for successive registration with said outlet of said working chamber, formers above said apertures and said turntable, said formers having an open lower end for communicating with said apertures for receiving cheese from said working chamber, means for indexing said turntable for successive registration of said apertures with said outlet of said working chamber.

2. Apparatus in accordance with claim 1 including means for maintaining a temperature in said working chamber sufficient to soften the fats at the cheese surface.

3. Apparatus in accordance with claim 1 wherein said means for indexing said turntable for registration with said apertures comprises a drive shaft connected to said turntable, a motor driving said shaft, means to close the motor circuit and energize the motor, means to interrupt said circuit and stop said turntable when said apertures are in registration with said forming chamber.

4. Apparatus in accordance with claim 3 wherein said means to interrupt said motor circuit comprises a cam on said drive shaft adjustable circumferentially on said shaft and a switch actuated by said cam.

5. Apparatus in accordance with claim 1 wherein said working chamber has a smooth walled passage generally cylindrical in cross-section and said passage has a first portion disposed beneath said outlet of said pressure means, a second portion generally at right angles to said first portion, a third portion extending generally at right angles to said second portion.

6. Apparatus in accordance with claim 1 wherein said working chamber is relieved at the outlet for removably receiving interchangeable sleeves.

7. Apparatus in accordance with claim 6 including a sleeve in said relieved outlet of said working chamber, said sleeve having an inside taper with the smaller diameter of said taper providing the outlet for said working chamber.

8. Apparatus in accordance with claim 1 wherein said working chamber has a constriction at said outlet.

9. Apparatus in accordance with claim 1 including means for removably securing said formers to said turntable.

10. Apparatus in accordance with claim 9 wherein said means for removably securing said formers to said turntable comprises a plurality of upstanding posts, a plate transversely mounted to said posts, one end of said posts secured to said turntable, said plate having a plurality of apertures therethrough, stems extending through said plate, cross bars at one end of said stems rotatably secured to said stems, a clamp surrounding each of said stems secured to said plate, handles transversely mounted to the top of said stems, and springs telescoped over said stems between said plate and said handles biasing said handles upwardly.

11. Apparatus in accordance with claim 1 including a support mounted above said working chamber having an aperture communicating with said working chamber, a plurality of brackets secured to said support and extending upwardly and above said turntable, rollers mounted on said supports in engagement with said turntable for rotation about an axis transverse to the axis of said turntable.

12. Apparatus in accordance with claim 2 wherein said means for maintaining a temperature in said working chamber comprises a water jacket surrounding said working chamber, said water jacket having a passage for water circulation and having an inlet connectable to a water source.

13. A method for molding and forming plastic curd cheese comprising the steps of forcing a column of cheese through a heated smooth walled chamber at a temperature sufficient to soften the fats in the cheese adjacent to and in contact with the chamber walls, extruding the cheese column through a constriction, measuring a length of cheese from the extruded column, shearing the measured length from the column, and rapidly cooling the measured length to firm the outer portion into a skin.

14. A method in accordance with claim 13 plus the preliminary step of kneading the cheese.

15. A working and flow chamber for processing plastic curd cheese comprising a generally cylindrical smooth walled flow passage having a plurality of angular successive bends providing at least two abrupt changes in direction of flow of cheese therethrough.

16. A working chamber in accordance with claim 15 including a removable plate at a bend for cleaning said working chamber.

References Cited

UNITED STATES PATENTS

| | | | |
|---|---|---|---|
| 541,642 | 6/1895 | Traiser | 31—8 |
| 1,481,127 | 1/1924 | Doering | 31—8 |
| 2,481,690 | 9/1949 | Schaub | 31—8 |
| 2,484,005 | 10/1949 | Alberti | 31—8 |
| 2,592,793 | 4/1952 | Coon et al. | 53—230 |
| 2,996,755 | 8/1961 | Weber | 17—35 |
| 3,075,286 | 1/1963 | McVicker et al. | 31—14 |
| 3,101,540 | 8/1963 | Dzenis | 31—46 |
| 3,330,160 | 7/1967 | Stevenson | 17—35 X |

ALDRICH F. MEDBERY, *Primary Examiner.*

U.S. Cl. X.R.

31—8, 9, 13, 89; 107—14; 53—25; 264—148